United States Patent
Hsu

(10) Patent No.: US 7,900,353 B2
(45) Date of Patent: Mar. 8, 2011

(54) METHOD FOR COMBINING AXIALLY HEATED HEAT PIPES AND HEAT-CONDUCTING BASE

(75) Inventor: Hul-Chun Hsu, Taichung (TW)

(73) Assignee: Jaffe Limited (VG)

( * ) Notice: Subject to any disclaimer, the term of this patent is extended or adjusted under 35 U.S.C. 154(b) by 894 days.

(21) Appl. No.: 11/465,194

(22) Filed: Aug. 17, 2006

(65) Prior Publication Data

US 2008/0047139 A1    Feb. 28, 2008

(51) Int. Cl.
    *B21D 51/16* (2006.01)
(52) U.S. Cl. .................. 29/890; 29/437; 29/515
(58) Field of Classification Search ............ 29/437, 29/444, 515, 837, 838, 844, 890; 228/115, 228/119, 212
    See application file for complete search history.

(56) References Cited

U.S. PATENT DOCUMENTS

| | | | |
|---|---|---|---|
| 1,788,201 A * | 1/1931 | Murray, Jr. et al. | 219/86.1 |
| 3,882,934 A * | 5/1975 | Knoos et al. | 165/164 |
| 5,216,580 A * | 6/1993 | Davidson et al. | 361/700 |
| 5,253,702 A * | 10/1993 | Davidson et al. | 165/80.4 |
| 6,189,213 B1 * | 2/2001 | Kimura et al. | 29/890.035 |
| 6,237,223 B1 * | 5/2001 | McCullough | 29/890.032 |
| 6,896,040 B2 * | 5/2005 | Hul-Chun | 165/104.26 |
| 7,467,878 B2 * | 12/2008 | Li | 362/294 |
| 2001/0050165 A1 * | 12/2001 | Cheung et al. | 165/104.34 |

FOREIGN PATENT DOCUMENTS

TW    200421071    10/2004

OTHER PUBLICATIONS

"Concentric." Merriam-Webster Online Dictionary. 2009. Merriam-Webster Online. Aug. 25, 2009 <http://www.merriam-webster.com/dictionary/concentric>.*

* cited by examiner

*Primary Examiner* — David P Bryant
*Assistant Examiner* — Jacob J Cigna
(74) *Attorney, Agent, or Firm* — Chun-Ming Shih; HDLS IPR Services

(57) ABSTRACT

A method for combining axially heated heat pipes and a heat-conducting base includes the steps of preparing a heat-conducting base and a plurality of heat pipes, providing a plurality of penetrating holes on a surface of the heat-conducting base, inserting one end of each heat pipe into the individual penetrating hole of the heat-conducting base, performing a lateral pressing to the heat-conducting base so as to bring each heat pipe into a tight and planar contact with the wall of each corresponding penetrating hole in the direction of pressing, and grinding the bottom surface of the heat-conducting base to become a flat surface to make the end of each heat pipe flush with the bottom surface of the heat-conducting base.

6 Claims, 6 Drawing Sheets

METHOD FOR COMBINING AXIALLY HEATED HEAT PIPES AND HEAT-CONDUCTING BASE

BACKGROUND OF THE INVENTION

1. Field of the Invention

The present invention relates to a method for combining axially heated heat pipes and a heat-conducting base. Especially, the present invention relates to a method for combining the heat-conducting base and the heat pipes by means of pressing.

2. Description of Prior Art

With regard to the technique for combining the heat pipes and the heat-conducting base, for example, it is disclosed in Taiwan Patent Publication No.200421071 entitled "Method for combining heat pipes with a heat-conducting base".

However, the technique disclosed in the above-mentioned patent document lies in that holes are provided on a solid heat-conducting base to correspond to the heat pipes. Further, after the heat pipes are embedded into the holes, an external force is applied to the heat-conducting base so that it is deformed together with the heat pipes. In this way, the heat pipes can be tightly combined into the holes of the heat-conducting base.

It is well known that when a metal is pressed to generate a plastic deformation due to the external force, it is necessary to utilize a stress, so that the material can generate a plastic flow to cause a permanent deformation. However, in the above-mentioned patent document, a solid heat-conducting base is directly pressed and the top and bottom surfaces of the heat-conducting base are directly pressed. Theoretically, the applied external force should be very large. Therefore, it may be more or less difficult in practical production. At the same time, in the above-mentioned patent document, a plastic flowing pattern will be formed on the pressing surface after the pressing operation, resulting in the unevenness of the surface. Therefore, when the heat-conducting base is adhered to a heat source, a gap is formed therebetween to cause a heat resistance and thus the heat-conducting effect is adversely affected.

In view of the above, the inventor proposes the present invention to overcome the above problems based on his expert experiences and deliberate researches.

SUMMARY OF THE INVENTION

The present invention is to provide a method for combining axially heated heat pipes and a heat-conducting base, in which a lateral pressing is utilized to facilitate the production. Further, after the pressing operation, the bottom surface of the heat-conducting base is further ground, so that one end portion of each heat pipe is flush with the bottom surface of the heat-conducting base and thus is heated directly. In this way, a better heat-conducting effect can be obtained.

The present invention provides a method for combining axially heated heat pipes and a heat-conducting base, which comprises the steps of:

a) preparing a heat-conducting base and a plurality of heat pipes;

b) providing a plurality of penetrating holes on a surface of the heat-conducting base, and inserting one end of each heat pipe into the individual penetrating hole of the heat-conducting base;

c) performing a lateral pressing to the heat-conducting base so as to bring each heat pipe into a tight and planar contact with the wall of each corresponding penetrating hole in the direction of pressing; and d) grinding the bottom surface of the heat-conducting base to become a flat surface to make the end portion of each heat pipe flush with the bottom surface of the heat-conducting base.

DETAILED DESCRIPTION OF THE INVENTION

In order to make the Examiner better understand the characteristics and the technical contents of the present invention, a detailed description relating to this will be made with reference to the accompanying drawings. However, it should be understood that the drawings are illustrative but not used to limit the scope of the present invention.

Figure 1:
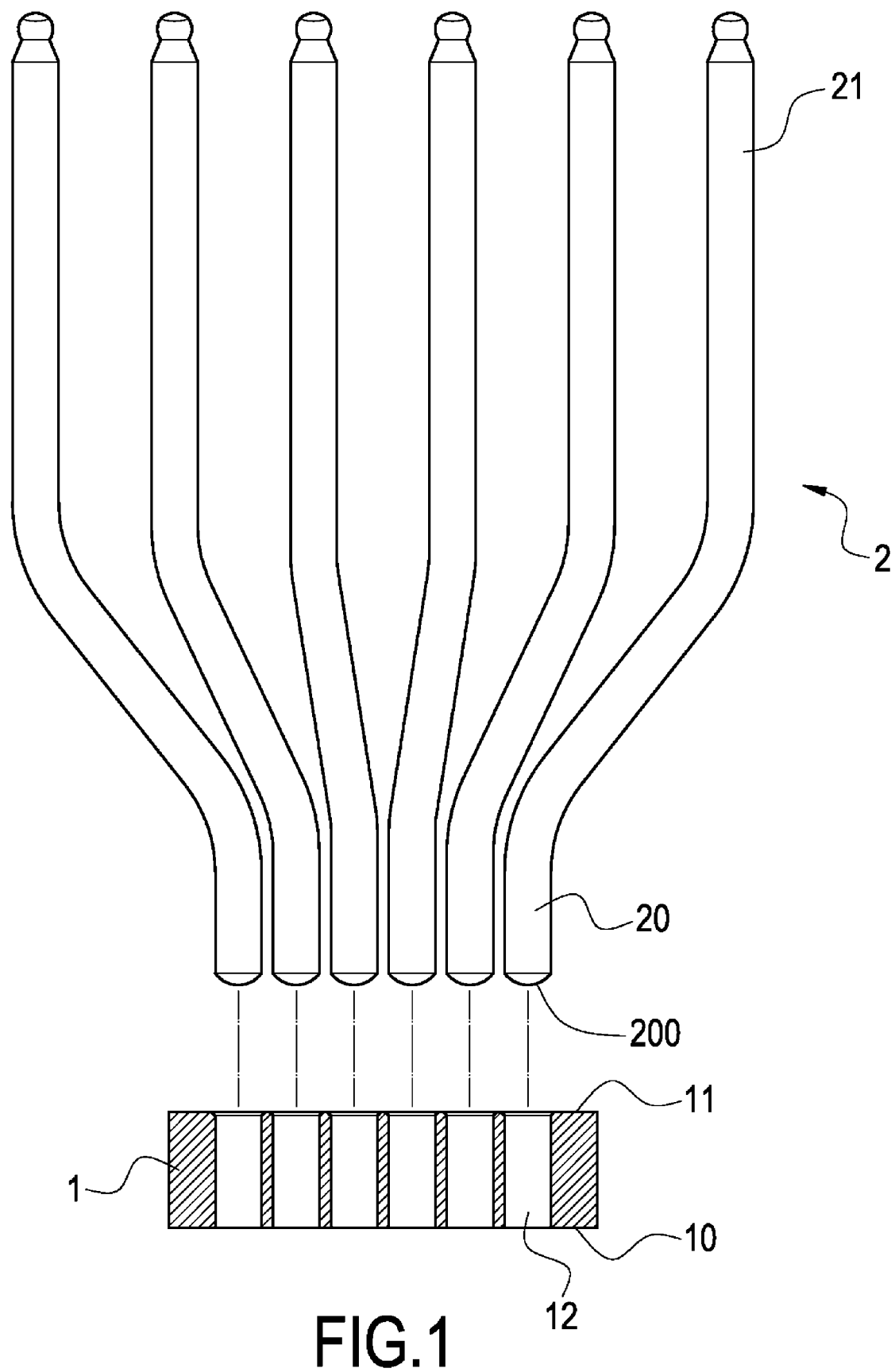
FIG. 1 is an exploded schematic view showing the heat-conducting base and the heat pipe of the present invention.
Figure 2:
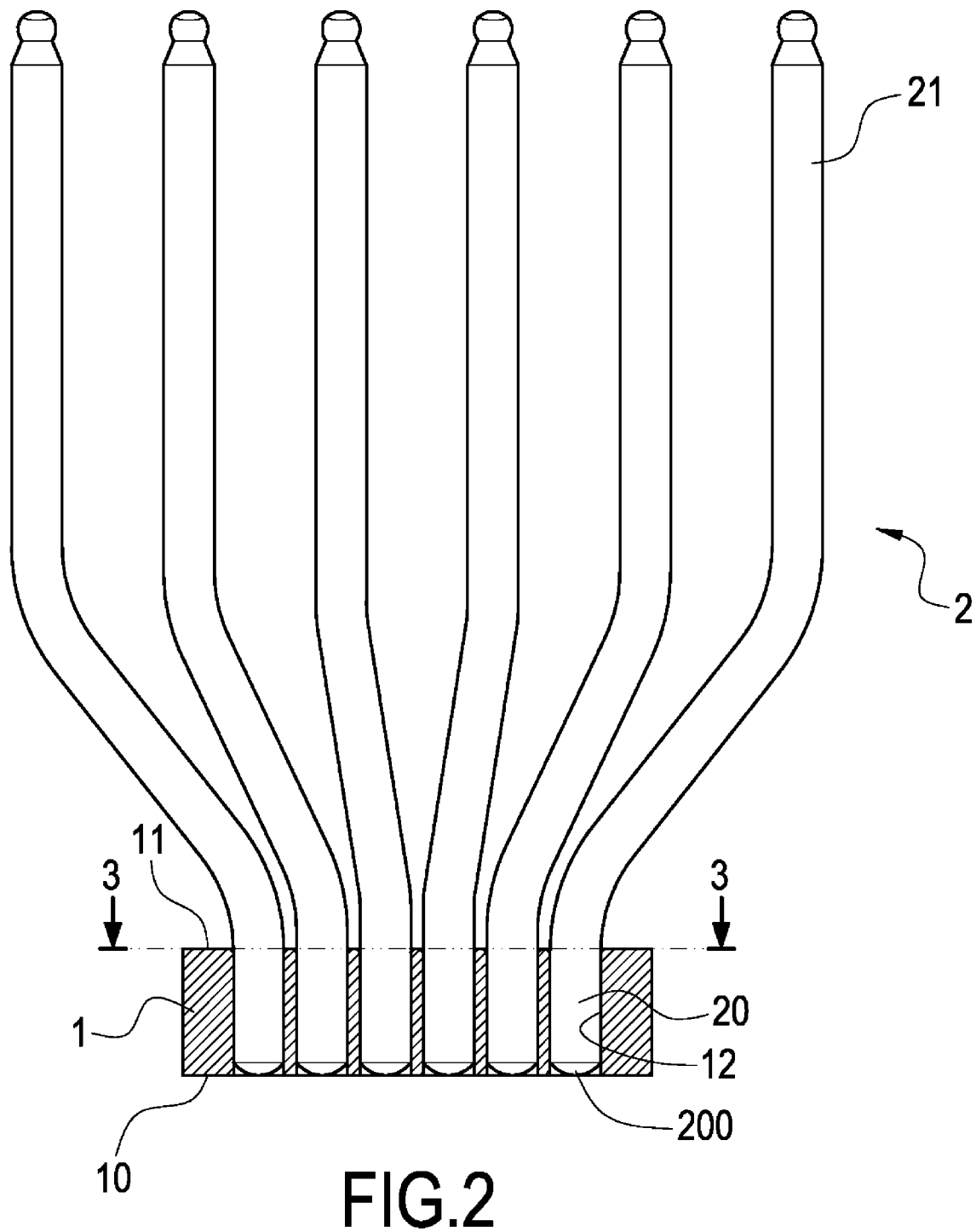
FIG. 2 is an assembled schematic view showing the heat-conducting base and the heat pipe of the present invention.

With reference to FIG. 1 and FIG. 2, they are an exploded schematic view and an assembled schematic view of the heat-conducting base and heat pipes of the present invention, respectively. The present invention provides a method for combining axially heated heat pipes and a heat-conducting base, which comprises the following steps.

Figure 3:
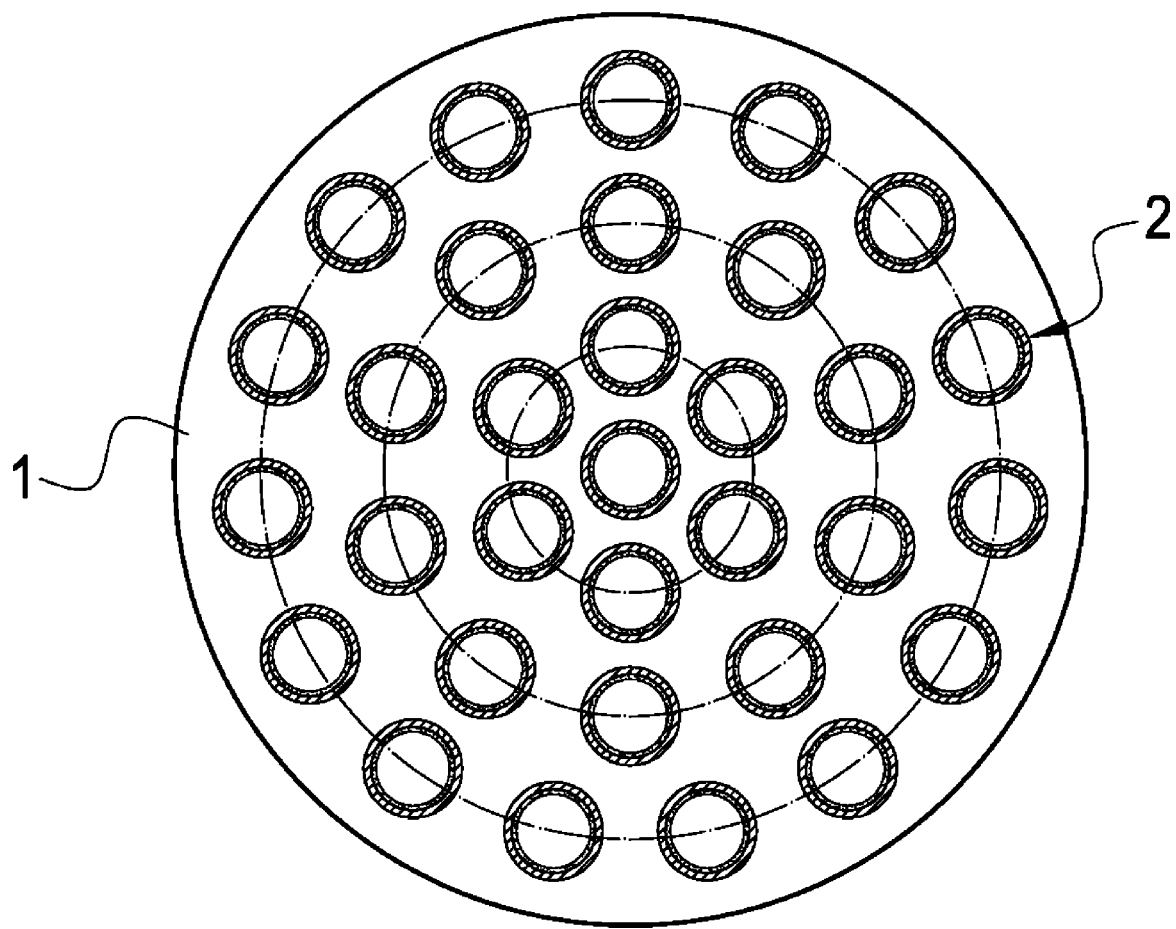
FIG. 3 is a cross-sectional view taken along the line 3-3 in FIG. 2.

First, a heat-conducting base 1 and a plurality of heat pipes 2 are prepared. The heat-conducting base 1 is made of materials having good heat conductivity such as aluminum or copper and is formed into a flat late. The bottom surface of the heat-conducting base 1 has a surface 10 to be heated for adhering onto a heat source. The surface 10 to be heated is substantially a flat surface. The top surface of the heat-conducting base 1 has a heat-dissipating surface 11 opposing to the surface 10 to be heated. The heat-dissipating surface is substantially a round surface and one of the penetrating holes is located at a center of the round surface and other penetrating holes are arranged at different circles with the same center of the round surface. On the heat-dissipating surface 11, a plurality of penetrating holes 12 is provided toward the surface 10 to be heated. Those penetrating holes 12 can be distributed on the heat-dissipating surface 11 in a concentric manner, as shown in FIG. 3. The number of the penetrating holes 12 is consistent with that of the heat pipes 2.

According to the above, each heat pipe 2 has an end 20 to be heated and a condensed end 21 away from the end 20 to be heated. The end 20 to be heated of each heat pipe 2 penetrates into the penetrating holes 12 of the heat-conducting base 1 respectively to be brought into a heat-conducting contact and connection therewith. Further, the axial direction of the pipe body of the end 21 to be heated of the heat pipe 2 is identical to that of the corresponding penetrating hole 12 and substantially perpendicular to the heat-dissipating surface 11. Heat-conducting paste can be applied between the end 20 to be heated of each heat pipe 2 and the penetrating hole 12, thereby to fill the gap therebetween and increase the heat-conducting efficiency.

Figure 4:
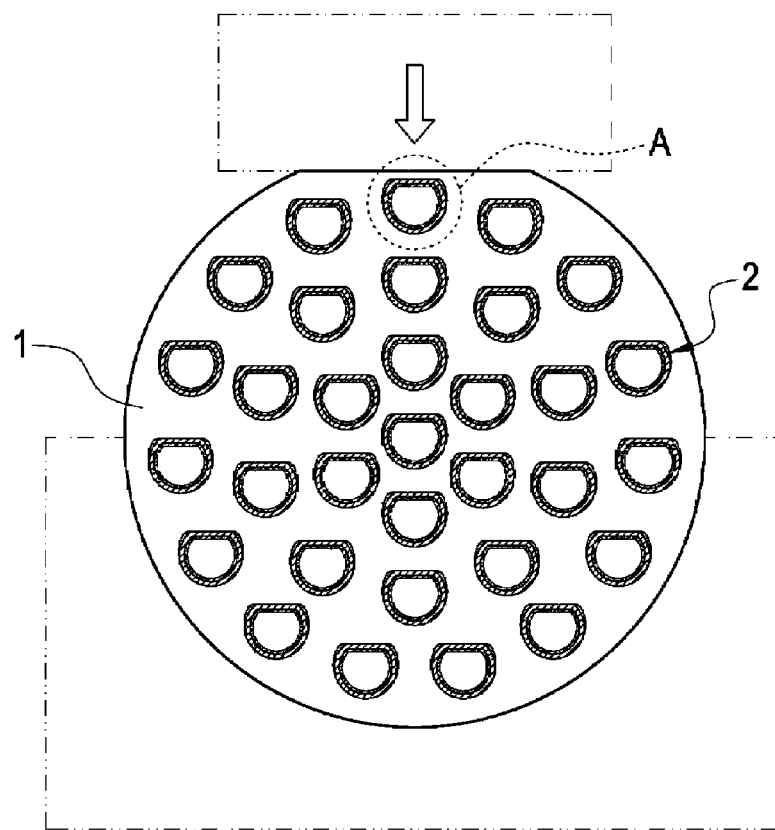
FIG. 4 is a cross-sectional view showing that the heat-conducting base of the present invention has already been pressed.
Figure 5:
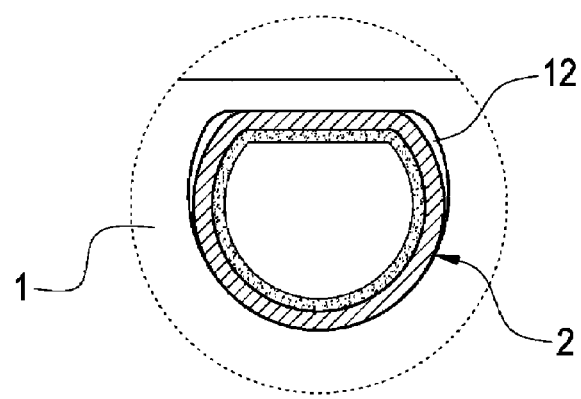
FIG. 5 is an enlarged view showing the details of portion A in FIG. 4.
Figure 7:
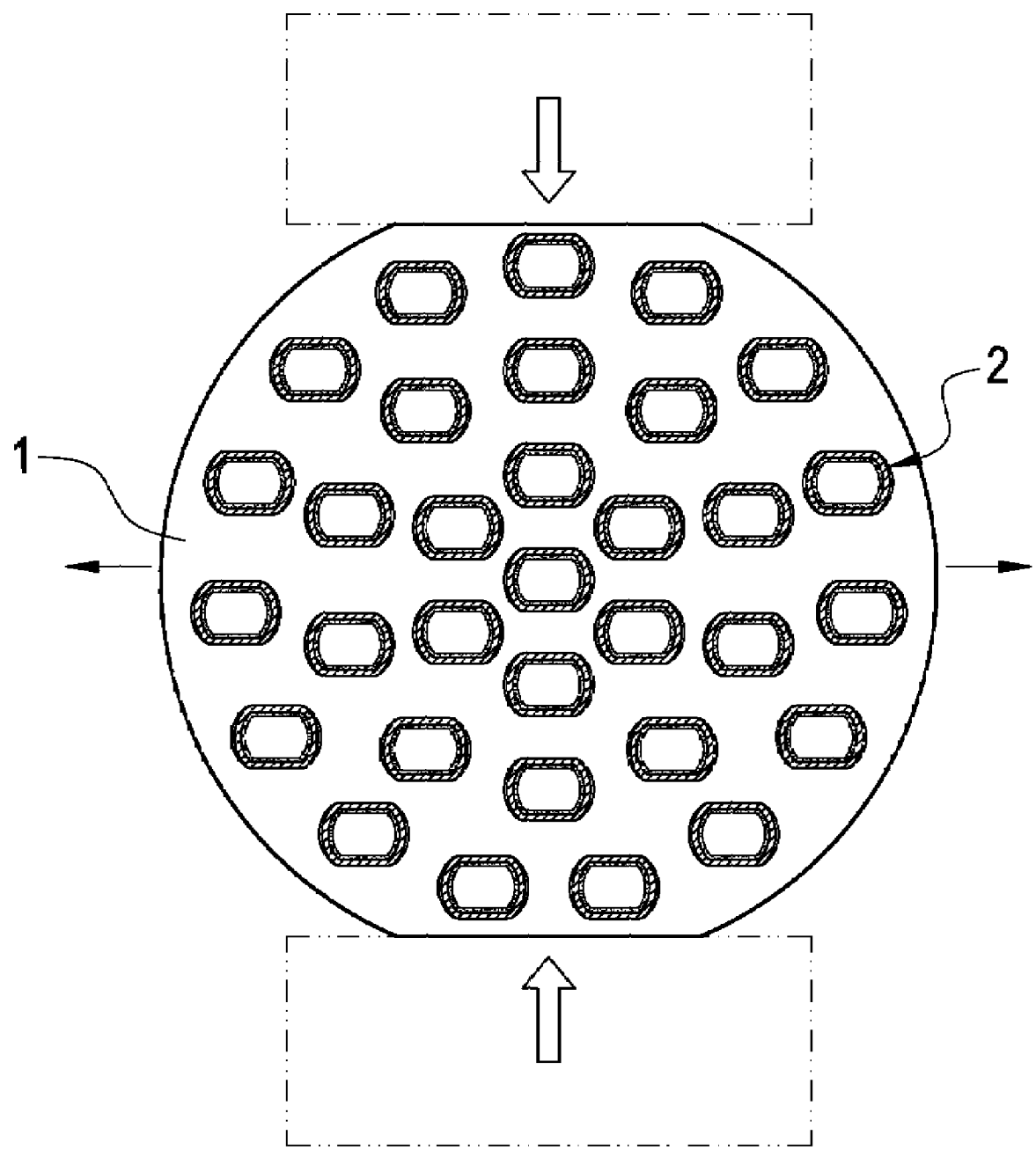
FIG. 7 is a cross-sectional view showing another method for pressing the heat-conducting base of the present invention.

Next, with reference to FIG. 4, after each heat pipe 2 is inserted onto the heat-conducting base 1, a lateral pressing can be applied to one side of the heat-conducting base 1. In pressing, one side of the heat-conducting base 1 is held by a concave mold, and the other side is pressed by a planar mold with an external force, as shown in FIG. 4. Alternatively, two planar molds may be simultaneously used to apply an external force toward each other to laterally press the heat-conducting base 1, as shown in FIG. 7. In this way, the heat-conducting base 1 and the end 20 to be heated of each heat pipe 2 generate a plastic deformation due to the external force. As a result, the end 20 to be heated of each heat pipe 2 and the wall of the corresponding penetrating hole 12 can be brought into a tight and planar contact in the direction of pressing (i.e., at the flattened portions after pressing), as shown in FIG. 5. As a result, the heat-conducting base 1 and each heat pipe 2 can be combined together.

Further, after the above steps, a soldering material such as soldering paste can be first heated to be molten. Then, the molten soldering paste is filled into the gap between the end 20 to be heated of each heat pipe 2 and the penetrating holes 12, thereby to increase the heat-conducting efficiency.

Figure 6:
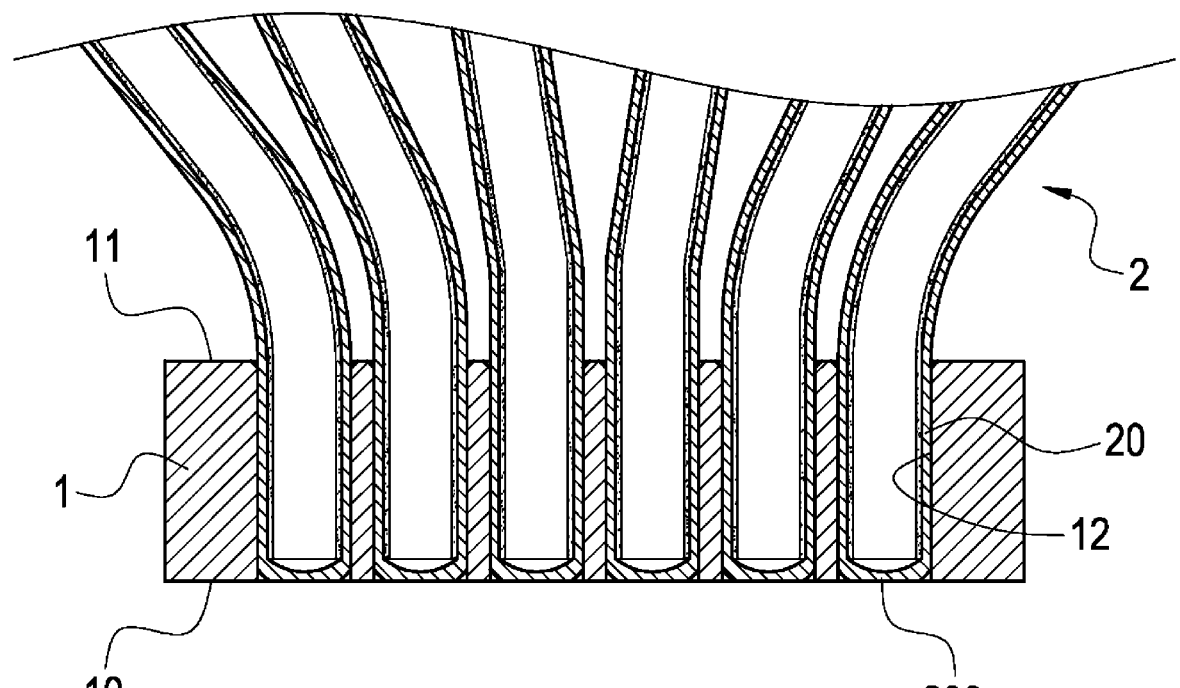
FIG. 6 is a partially cross-sectional view showing that the pressed heat-conducting base of the present invention has already been ground.

Finally, as shown in FIG. 6, since the surface 10 to be heated of the heat-conducting base 1 cannot keep its original flatness after pressing, a grinding process should be applied to the surface 10 to be heated. Further, the end portion 200 of the end 20 to be heated of each heat pipe 2 can be further formed into a flat surface. With a machining process such as grinding, the end portion 200 of the end 20 to be heated of each heat pipe 2 is made to be flush with the surface 10 to be heated of the heat-conducting base 1. In this way, the end portion 200 of the end 20 to be heated of each heat pipe 2 can be directly heated, thereby to achieve a better heat-conducting effect.

Therefore, with the above procedure, the method for combining axially heated heat pipes and a heat-conducting base in accordance with the present invention can be achieved.

According to the above, the present invention indeed achieves the desired effects and solves the drawbacks of prior art. Further, the present invention involves the novelty and inventive steps, and thus conforms to the requirements for an invention patent.

Although the present invention has been described with reference to the foregoing preferred embodiment, it will be understood that the invention is not limited to the details thereof. Various equivalent variations and modifications can still be occurred to those skilled in this art in view of the teachings of the present invention. Thus, all such variations and equivalent modifications are also embraced within the scope of the invention as defined in the appended claims.

What is claimed is:

1. A method for combining axially heated heat pipes and a heat-conducting base, comprising the steps of:
   preparing a heat-conducting base with a bottom surface to be heated for adhering onto a heat source and a heat-dissipating surface opposite to the bottom surface, and a plurality of heat pipes each with an end to be heated and a condensed end opposite to the end to be heated;
   providing a plurality of penetrating holes on the heat-dissipating surface of the heat-conducting base, and inserting the end to be heated of each heat pipe into a corresponding penetrating hole of the heat-conducting base, an axial direction of the end to be heated of the heat pipe being substantially identical to that of the corresponding penetrating hole and substantially perpendicular to the heat-dissipating surface;
   performing a lateral pressing to the heat-conducting base so as to bring each heat pipe into a tight and planar contact with the wall of the corresponding penetrating hole in a direction of pressing; and
   grinding the bottom surface of the heat-conducting base to become a flat surface to make an end portion of the end to be heated of each heat pipe flush with the bottom surface of the heat-conducting base, so that the end portion of the end to be heated of each heat pipe is directly heated by the heat source,
   wherein the heat-dissipating surface is substantially a round surface and one of the penetrating holes is located at a center of the round surface and other penetrating holes are arranged at different circles with the same center of the round surface.

2. The method for combining axially heated heat pipes and a heat-conducting base according to claim 1, wherein the heat-conducting base is made of aluminum or copper.

3. The method for combining axially heated heat pipes and a heat-conducting base according to claim 1, wherein each penetrating hole is a through hole or blind hole.

4. The method for combining axially heated heat pipes and a heat-conducting base according to claim 1, wherein a heat-conducting paste is applied between the end to be heated of each heat pipe and the penetrating hole so as to fill a gap therebetween.

5. The method for combining axially heated heat pipes and a heat-conducting base according to claim 1, wherein a soldering material is heated to be molten and thus filled into a gap between the end to be heated and the penetrating hole.

6. The method for combining axially heated heat pipes and a heat-conducting base according to claim 5, wherein the soldering material is a soldering paste.

\* \* \* \* \*